US012393487B1

(12) United States Patent
Yao et al.

(10) Patent No.: US 12,393,487 B1
(45) Date of Patent: Aug. 19, 2025

(54) VBIOS CONTINGENCY RECOVERY

(71) Applicant: Advanced Micro Devices, Inc., Santa Clara, CA (US)

(72) Inventors: Chou-Yang Yao, Taipei (TW); Siang-Ning Zeng, Taipei (TW); Chih-Hua Chang, Taipei (TW); Tung-Yueh Kuo, Taipei (TW); Fang-Yu Chou, Taipei (TW); Tao Liang, Shanghai (CN)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/617,531

(22) Filed: Mar. 26, 2024

(51) Int. Cl.
*G06F 11/00* (2006.01)
*G06F 8/65* (2018.01)
*G06F 11/14* (2006.01)

(52) U.S. Cl.
CPC .............. *G06F 11/142* (2013.01); *G06F 8/65* (2013.01); *G06F 11/1407* (2013.01)

(58) Field of Classification Search
CPC ....... G06F 11/142; G06F 8/65; G06F 11/1407
See application file for complete search history.

(56) References Cited

U.S. PATENT DOCUMENTS

| | | | | |
|---|---|---|---|---|
| 8,341,386 B2 * | 12/2012 | Lee | ...................... | G06F 11/1433 713/1 |
| 2015/0212890 A1 * | 7/2015 | Sudharsanan | ............. | G06T 1/60 714/11 |

* cited by examiner

*Primary Examiner* — Jason B Bryan
(74) *Attorney, Agent, or Firm* — Volpe Koenig

(57) ABSTRACT

A computing device and a method of flashing VBIOS instructions are provided. The computing device comprises non-volatile system memory and a graphics processor. The graphics processor is in communication with the non-volatile system memory and comprises additional non-volatile memory. The graphics processor is configured to: prior to flashing video basic input/output system (VBIOS) instructions, write a copy of a portion of the VBIOS instructions from the additional non-volatile memory to the non-volatile system memory; flash the VBIOS instructions; on a condition that the flashing of the VBIOS instructions is stopped before completion, write the copy of the portion of the VBIOS instructions from the non-volatile system memory to the additional non-volatile memory; and re-flash the VBIOS instructions using the copy of the portion of the VBIOS instructions.

20 Claims, 4 Drawing Sheets

VBIOS CONTINGENCY RECOVERY

BACKGROUND

Basic input/output system (BIOS) is firmware stored in nonvolatile memory (e.g., read-only memory (ROM)) of a computing device. BIOS executes when a computing device is powered up and is used by software programs (e.g., for operating systems and other software) to perform hardware initialization for accessing system hardware during the booting process.

In a similar fashion, video BIOS (VBIOS) is firmware stored in nonvolatile memory of a graphics device (e.g., graphics card) and executes when the computing device is powered up. VBIOS provides a set of video-related functions which are used by software programs to initialize the graphics device (e.g., initialize the discrete accelerated processing device (dGPU) of the graphics device) at boot time for accessing the video hardware of the dGPU. The VBIOS includes hardware settings (e.g., settings for controlling clock speed or frequency, fan speed, voltages and power draw levels) used to execute video and graphics related functions.

BRIEF DESCRIPTION OF THE DRAWINGS

A more detailed understanding can be had from the following description, given by way of example in conjunction with the accompanying drawings wherein.

DETAILED DESCRIPTION

Figure 1:
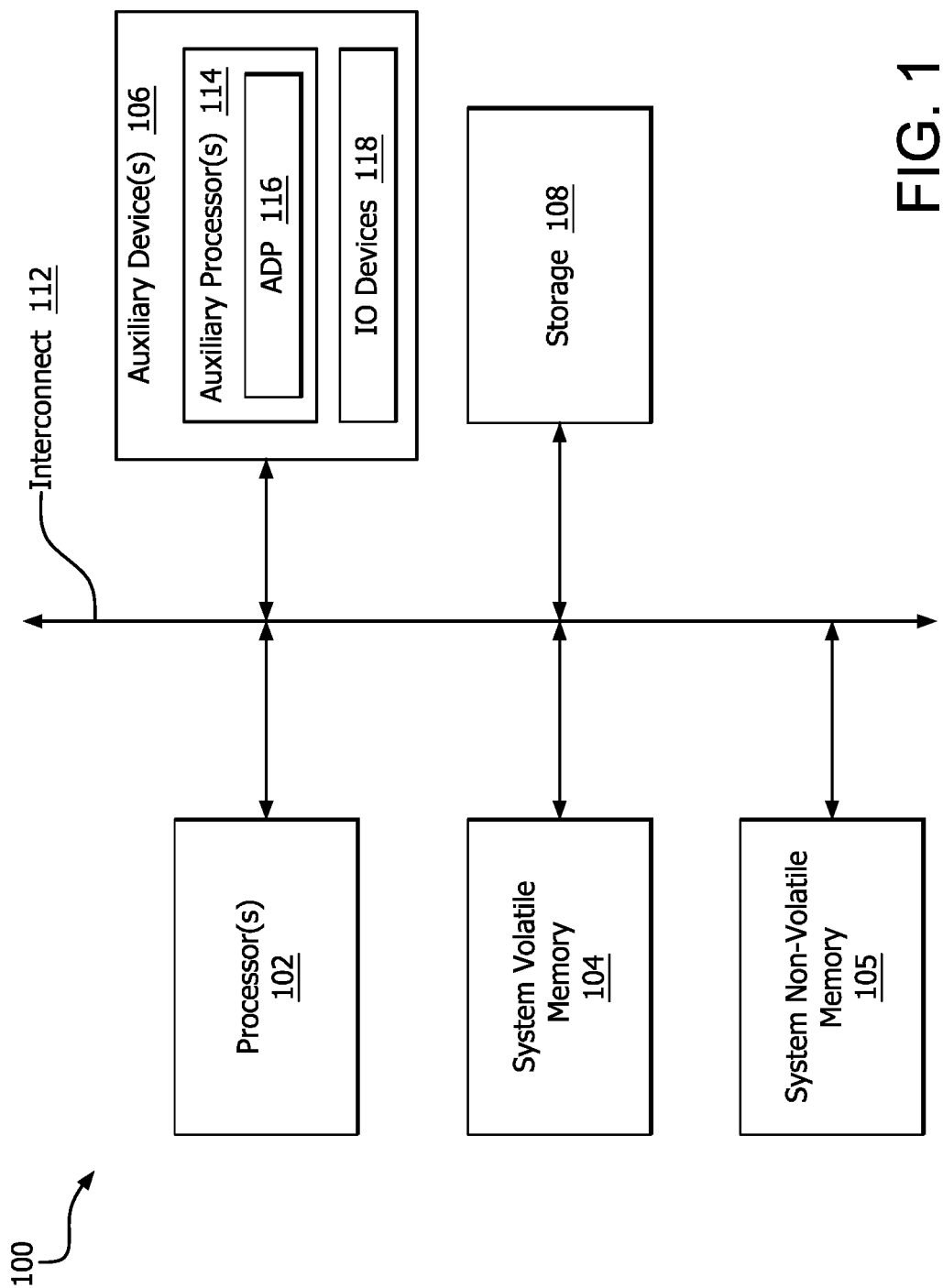
FIG. 1 is a block diagram of an example computing device in which one or more features of the disclosure can be implemented.

The VBIOS of computing device is sometimes updated with a newer version of the VBIOS (i.e., flashing), for example, to address or correct critical issues of the VBIOS after the computing device has been shipped on the market. The VBIOS of the computing device is updated (i.e., flashed) by replacing the existing version of the VBIOS in the nonvolatile memory (e.g., dGPU ROM) of the graphics device (e.g., graphics card) with the newer version of the VBIOS.

The VBIOS is stored in nonvolatile memory (e.g., ROM) so that the VBIOS is maintained in the dGPU ROM after the computing device is powered off and can re-execute again during the boot process of the computing device. In addition, the VBIOS is stored in the nonvolatile memory of the graphics device (e.g., ROM of a dGPU), and not the system ROM, because there is typically not enough space in the system ROM to store the VBIOS (e.g., typically about 10,000 k-15,000 k bytes). Then, when the VBIOS is executed during the boot process, the VBIOS is loaded from the dGPU ROM into the system read access memory (RAM) and control is transferred to the VBIOS.

However, when the VBIOS is flashed (e.g., replaced in the dGPU ROM with the new VBIOS), the flashing process can be terminated before completion of the flashing (e.g., the computing device is unexpectedly powered off or a system crash occurs). Accordingly, the partially updated data in the dGPU ROM can become damaged (e.g., corrupted) and the dGPU cannot be re-initialized at the device (e.g., via software at the device). That is, when the flashing of the VBIOS instructions is unexpectedly terminated before completion, the VBIOS data can become corrupted, causing both the bootloader portion of the VBIOS instructions and security keys to be compromised (e.g., damaged or lost). Accordingly, the legitimacy of the VBIOS cannot be determined and specific registers, which are used by the dGPU (e.g., used by the compute units of the dGPU) to communicate with the dGPU ROM registers, are not accessible (e.g., the dGPU ROM cannot be read from or written to) and the dGPU cannot be re-initialized. In these situations, the damaged data must be recovered via hardware and is typically shipped back to the manufacturer to restore the damaged data by probing the pins of the dGPU ROM.

Features of the present disclosure provide devices and methods for re-initializing the dGPU at the computing device (e.g., via software by the end user of the computing device) when the flashing of the VBIOS instructions is unexpectedly terminated before completion (in contrast to shipping the computing device back to the manufacturer).

Prior to flashing the VBIOS instructions, a space is reserved in the system ROM and a copy of a portion of the VBIOS instructions (e.g., bootloader portion) stored in the ROM of the graphics device (e.g., dGPU ROM) is written to the system ROM. When an instruction is received (e.g., via a user input) to begin the flashing process, the copy of the bootloader portion is, for example, automatically written to the system ROM without any additional user input.

The bootloader portion of the VBIOS instructions, which is written to the system ROM, is a portion that initializes the VBIOS flashing. That is, copy of the bootloader portion of the VBIOS can be used to re-initialize the VBIOS flashing. In addition, because the size (e.g., typically about 300K bytes) of the bootloader portion of the VBIOS instructions is far less than the size of the VBIOS instructions, the bootloader portion can be stored in the system ROM.

The VBIOS instructions are then flashed (e.g., updated with the newer version of the VBIOS). On the condition that the flashing of the VBIOS instructions is terminated (e.g., the computing device is unexpectedly powered off or a system crash occurs) before the flashing is completed, the copy of the portion of the VBIOS instructions is read from the system ROM and written to the additional non-volatile memory of the graphics device (e.g., dGPU ROM).

Accordingly, because the copy of the bootloader portion of the VBIOS instructions is written to the additional non-volatile memory, specific registers which are used by the dGPU (e.g., used by the compute units of the dGPU) to communicate with the dGPU ROM, become accessible and the dGPU can be re-initialized at the computing device.

A computing device for use with graphics processing is provided which includes non-volatile system memory and a graphics processor, in communication with the non-volatile system memory. The graphics processor comprises additional non-volatile memory and is configured to: prior to flashing VBIOS instructions, write a copy of a portion of the VBIOS instructions from the additional non-volatile memory to the non-volatile system memory; flash the VBIOS instructions; on a condition that the flashing of the VBIOS instructions is stopped before completion, write the copy of the portion of the VBIOS instructions from the non-volatile system memory to the additional non-volatile memory; and re-flash the VBIOS instructions using the copy of the portion of the VBIOS instructions.

A method of flashing VBIOS instructions is provided which comprises prior to flashing the VBIOS instructions, writing a copy of a portion of the VBIOS instructions to non-volatile system memory of a computing device from additional non-volatile memory of a graphics processor; flashing the VBIOS instructions; on a condition that the flashing of the VBIOS instructions is stopped before completion, write the copy of the portion of the VBIOS instructions from the non-volatile system memory to the additional non-volatile memory; and re-flashing the VBIOS instructions using the copy of the portion of the VBIOS instructions.

A non-transitory computer readable medium comprising instructions for causing a computer to execute a method of flashing VBIOS instructions comprising writing a copy of a portion of the VBIOS instructions to non-volatile system memory of a computing device from additional non-volatile memory of a graphics processor; flashing the VBIOS instructions; on a condition that the flashing of the VBIOS instructions is stopped before completion, write the copy of the portion of the VBIOS instructions from the non-volatile system memory to the additional non-volatile memory; and re-flashing the VBIOS instructions using the copy of the portion of the VBIOS instructions.

FIG. 1 is a block diagram of an example computing device 100 in which one or more features of the disclosure can be implemented. In various examples, the computing device 100 is one of, but is not limited to, for example, a computer, a gaming device, a handheld device, a set-top box, a television, a mobile phone, a tablet computer, or other computing device. The device 100 includes, without limitation, one or more processors 102, system volatile memory 104, system non-volatile memory 105, one or more auxiliary devices 106 and storage 108. An interconnect 112, which can be a bus, a combination of buses, and/or any other communication component, communicatively links the processor(s) 102, system volatile memory 104, system non-volatile memory 105, the auxiliary device(s) 106 and the storage 108.

In various alternatives, the processor(s) 102 include a central processing unit (CPU), a graphics processing unit (GPU), a CPU and GPU located on the same die, or one or more processor cores, wherein each processor core can be a CPU, a GPU, or a neural processor. In various alternatives, at least part of the memory 104 is located on the same die as one or more of the processor(s) 102, such as on the same chip or in an interposer arrangement, and/or at least part of the memory 104 is located separately from the processor(s) 102. The system volatile memory 104 includes, for example, random access memory (RAM), dynamic RAM, or a cache. The system non-volatile memory 105 includes, for example, read only memory (e.g., ROM 140 shown in FIG. 2).

The storage 108 includes a fixed or removable storage, for example, without limitation, a hard disk drive, a solid state drive, an optical disk, or a flash drive. The auxiliary device(s) 106 include, without limitation, one or more auxiliary processors 114, and/or one or more input/output ("IO") devices. The auxiliary processor(s) 114 include, without limitation, a processing unit capable of executing instructions, such as a central processing unit, graphics processing unit, parallel processing unit capable of performing compute shader operations in a single-instruction-multiple-data form, multimedia accelerators such as video encoding or decoding accelerators, or any other processor. Any auxiliary processor 114 is implementable as a programmable processor that executes instructions, a fixed function processor that processes data according to fixed hardware circuitry, a combination thereof, or any other type of processor. In some examples, the auxiliary processor(s) 114 include an accelerated processing device ("APD") 116. In addition, although processor(s) 102 and APD 116 are shown separately in FIG. 1, in some examples, processor(s) 102 and APD 116 may be on the same chip.

The one or more IO devices 118 include one or more input devices, such as a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals), and/or one or more output devices such as a display, a speaker, a printer, a haptic feedback device, one or more lights, an antenna, or a network connection (e.g., a wireless local area network card for transmission and/or reception of wireless IEEE 802 signals).

Figure 2:
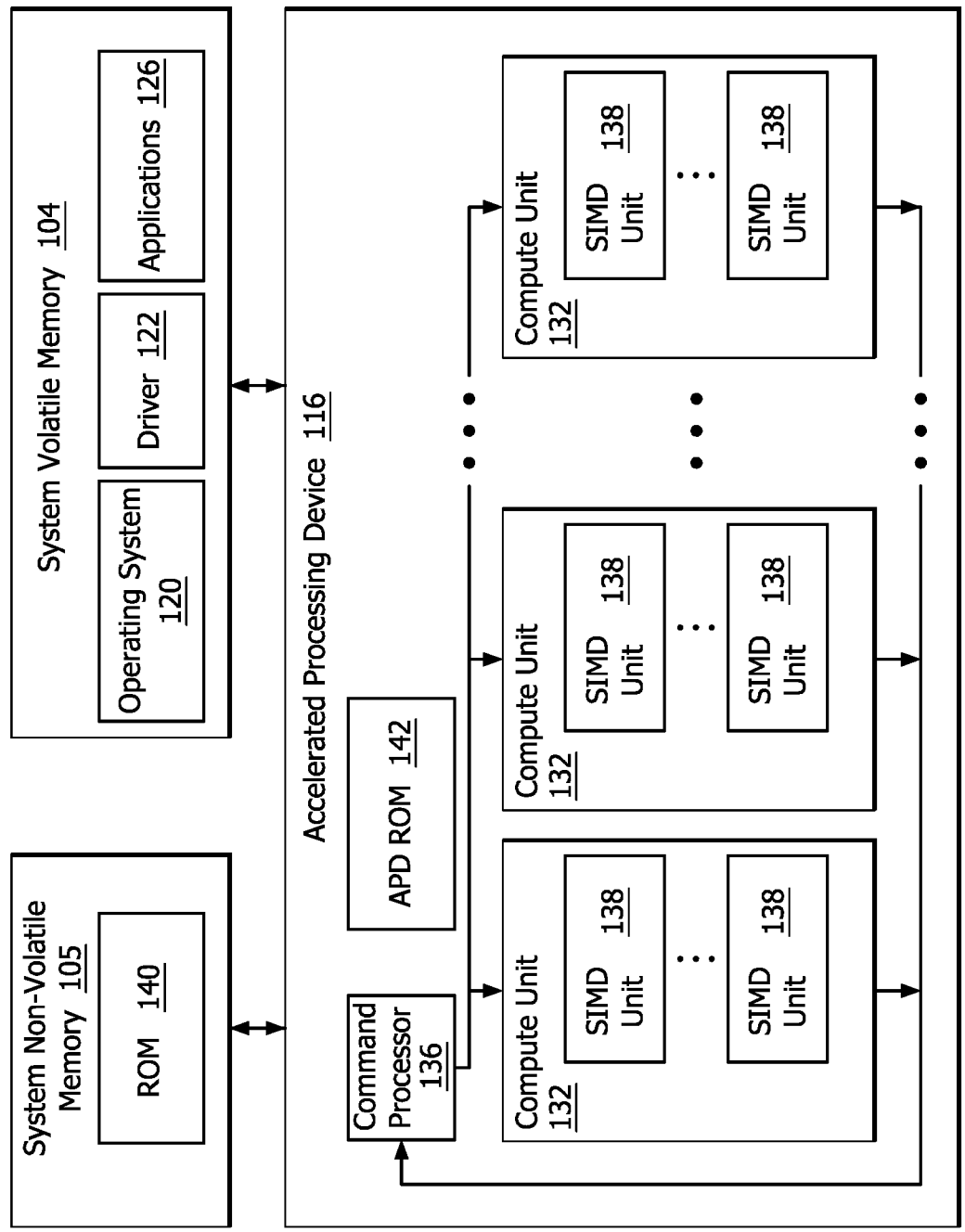
FIG. 2 is a block diagram of the computing device shown in FIG. 1, illustrating additional details related to execution of processing tasks on the accelerated processing device, according to an example.

FIG. 2 is a block diagram of the computing device 100 shown in FIG. 1, illustrating additional details related to execution of processing tasks on the APD 116, according to an example. The processor(s) 102 maintains, in system volatile memory 104, one or more control logic modules for execution by the processor(s) 102. The control logic modules include an operating system 120, a driver 122, and applications 126, and may optionally include other modules not shown. These control logic modules control various aspects of the operation of the processor(s) 102 and the APD 116. For example, the operating system 120 directly communicates with hardware and provides an interface to the hardware for other software executing on the processor(s) 102. The driver 122 controls operation of the APD 116 by, for example, providing an application programming interface ("API") to software (e.g., applications 126) executing on the processor(s) 102 to access various functionality of the APD 116. The driver 122 also includes a just-in-time compiler that compiles shader code into shader programs for execution by processing components (such as the SIMD units 138 discussed in further detail below) of the APD 116.

The APD 116 executes commands and programs for selected functions, such as graphics operations and non-graphics operations, which may be suited for parallel processing. The APD 116 can be used for executing graphics pipeline operations such as pixel operations, geometric computations, and rendering an image to a display device (e.g., one of the IO devices 118) based on commands received from the processor(s) 102. The APD 116 also executes compute processing operations that are not directly related to graphics operations, such as operations related to video, physics simulations, computational fluid dynamics, or other tasks, based on commands received from the processor 102 or that are not part of the "normal" information flow of a graphics processing pipeline, or that are completely unrelated to graphics operations (sometimes referred to as "GPGPU" or "general purpose graphics processing unit").

The APD 116 includes compute units 132 (which may collectively be referred to herein as "programmable processing units") that include one or more SIMD units 138 that are configured to perform operations in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by individual lanes, predication of lanes corresponding to control flow paths not currently being executed, and serial execution of different control flow paths, allows for arbitrary control flow to be followed.

The basic unit of execution in compute units 132 is a work-item. Each work-item represents a single instantiation of a shader program that is to be executed in parallel in a particular lane of a wavefront. Work-items can be executed simultaneously as a "wavefront" on a single SIMD unit 138. Multiple wavefronts may be included in a "work group," which includes a collection of work-items designated to execute the same program. A work group can be executed by executing each of the wavefronts that make up the work group. The wavefronts may be executed sequentially on a single SIMD unit 138 or partially or fully in parallel on different SIMD units 138. Wavefronts can be thought of as instances of parallel execution of a shader program, where each wavefront includes multiple work-items that execute simultaneously on a single SIMD unit 138 in line with the SIMD paradigm (e.g., one instruction control unit executing the same stream of instructions with multiple data). A command processor 137 is present in the compute units 132 and launches wavefronts based on work (e.g., execution tasks) that is waiting to be completed. A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, tessellation, geometry shading operations, and other graphics operations. A graphics processing pipeline 134 which accepts graphics processing commands from the processor(s) 102 thus provides computation tasks to the compute units 132 for execution in parallel.

The compute units 132 are also used to perform computation tasks not related to graphics or not performed as part of the "normal" operation of a graphics processing pipeline 134 (e.g., custom operations performed to supplement processing performed for operation of the graphics processing pipeline 134). An application 126 or other software executing on the processor(s) 102 transmits programs (often referred to as "compute shader programs," which may be compiled by the driver 122) that define such computation tasks to the APD 116 for execution. Although the APD 116 is illustrated with a graphics processing pipeline 134, the teachings of the present disclosure are also applicable for an APD 116 without a graphics processing pipeline 134.

The APD 116 is, for example, a dGPU of a graphics device (e.g., graphics card) and is configured to perform various functions for flashing VBIOS instructions. For example, the APD ROM 142 (e.g., dGPU ROM) is configured to store the VBIOS instructions that are used to initialize the dGPU at boot time for accessing the video hardware of the dGPU. The APD 116 and is configured to, prior to flashing the VBIOS instructions, write a copy of a portion of the VBIOS instructions from the APD ROM 142 to ROM 140 of the system non-volatile memory and flash the VBIOS instructions. On a condition that the flashing of the VBIOS instructions is stopped (e.g., unexpectedly terminated) before completion, the APD 116 and is configured to write the copy of the portion of the VBIOS instructions from the non-volatile system memory to the additional non-volatile memory and re-flash the VBIOS instructions using the copy of the portion of the VBIOS instructions.

Figure 3:
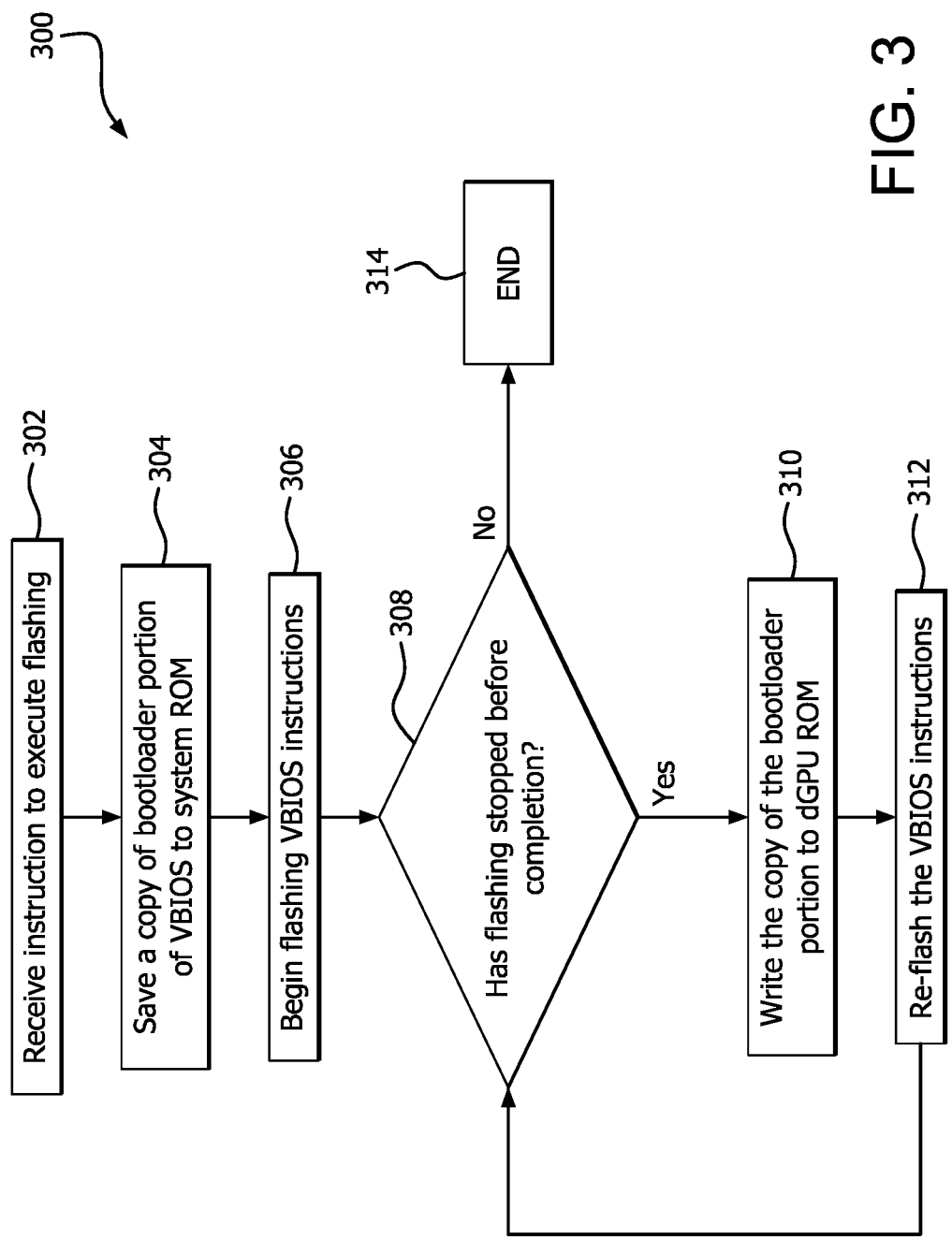
FIG. 3 is a flow diagram illustrating an example method of flashing VBIOS instructions according to features of the disclosure.

FIG. 3 is a flow diagram illustrating an example method 300 of flashing VBIOS instructions. Each of the steps shown in the method 300 at FIG. 3 are performed by an accelerated processor, such as for example APD 116 (e.g., a dGPU) shown in FIG. 2.

Figure 4:
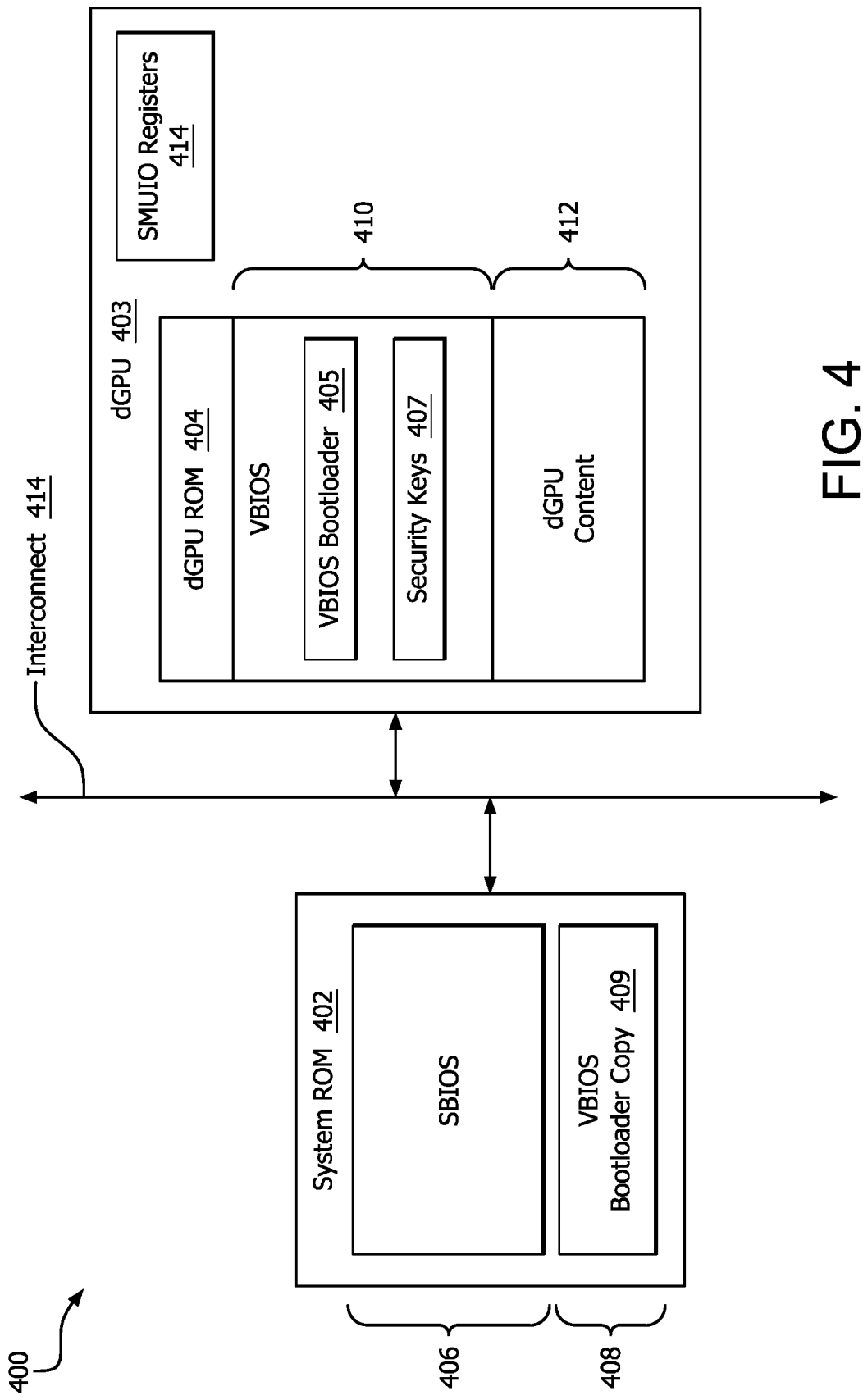
FIG. 4 is a block diagram of example components of a computing device in which one or more features of the disclosure can be implemented.

The example method 300 is described using components in the example computing device 400 shown in FIG. 4.

Computing device 400 includes system ROM 402 and dGPU 403 which includes dGPU ROM 404. The system ROM 402 is, for example, part of the system non-volatile memory 105 shown in FIG. 1.

The dGPU 403 is an example of an auxiliary processor 114 shown in FIG. 1. The dGPU 403 is also, for example, an accelerated processor of a graphics device (e.g., graphics card) which is an example of an auxiliary device 106 shown in FIG. 1. The dGPU ROM 404 is a portion of non-volatile memory of the dGPU 403 (e.g., APD ROM 142 shown in FIG. 2).

As shown in FIG. 4, the system ROM 402 includes a first portion of memory 406 configured to store SBIOS instructions and a second portion of non-volatile memory 408 configured to store a copy (e.g., backup) of the bootloader portion of the VBIOS instructions (i.e., VBIOS Bootloader Copy 409). The dGPU ROM 404 of dGPU 403 includes a first portion of non-volatile memory 410 configured to store the VBIOS instructions, comprising the bootloader portion 405 of the VBIOS instructions and security keys (e.g., digital signatures) 407. The dGPU ROM 404 also includes a second portion of memory 412 configured to store dGPU content (e.g., data). An interconnect 414, which can be a bus, a combination of buses, and/or any other communication component, communicatively links the system ROM 402 and the dGPU ROM 404.

The dGPU ROM 404 also includes specific registers (e.g., system management unit input/output (SMUIO) registers) 414 which are used by the dGPU 403 (e.g., used by the compute units 132 shown in FIG. 2) to communicate with the dGPU ROM 404. The dGPU 403 establishes specific policies for accessing the SMUIO registers 414 to enhance security and prevent data in the SMUIO registers 414 from being overwritten (e.g., by malicious software). The bootloader portion 405 of the VBIOS instructions and the security keys 407 are used to initialize the dGPU 403 and ensuring the validity and authenticity of its programming.

As shown at block 302, the method 300 includes receiving an instruction to execute a flashing of the VBIOS instructions. For example, the instruction to execute the flashing of the VBIOS instructions is provided to the dGPU 403 in response to a user input requesting the flashing of the VBIOS instructions.

As shown at block 304, prior to flashing the VBIOS instructions, the method includes writing a copy of a portion of the VBIOS instructions (e.g., VBIOS Bootloader Copy 409) to non-volatile system memory (e.g., system ROM 402) of a computing device (e.g., computing device 400) from additional non-volatile memory (e.g., dGPU ROM 404) of a processor (e.g., dGPU 403) of a graphics device (e.g., graphics card).

The portion of the VBIOS instructions is, for example, a bootloader portion of the VBIOS instructions which is configured to initialize the VBIOS for flashing for execution.

For example, prior to flashing the VBIOS instructions, the dGPU 403 automatically reserves a space in the non-volatile system ROM 402 for the VBIOS instructions and saves a copy of the bootloader portion of the VBIOS by writing a copy of the bootloader portion of the VBIOS instructions, currently stored in the dGPU ROM 404, to the system ROM 402 without any additional user input.

As shown at block 306, the method 300 includes flashing the VBIOS instructions. For example, the dGPU 403 uses the bootloader portion 405 of the VBIOS instructions and the security keys 407 to initialize the dGPU 403 and executes a flashing of the VBIOS instructions by replacing the existing version of the VBIOS in the dGPU ROM 403 of the graphics device (e.g., graphics card) with a new version of the VBIOS.

As shown at decision block 308, the method 300 includes determining whether or not the flashing of the VBIOS instructions is stopped before completion. For example, the flashing of the VBIOS instructions may be unexpectedly terminated before completion due to a loss of power to the computing device or a system crash. When the flashing of the VBIOS instructions is unexpectedly terminated before completion, the VBIOS data can become corrupted, causing both the bootloader portion 405 of the VBIOS instructions and the security keys 407 being compromised (e.g., damaged or lost). Accordingly, in the absence of the bootloader and security keys, the legitimacy of the VBIOS cannot be determined and the SMUIO registers 414 are not accessible, the dGPU ROM 404 (i.e., cannot be read from or written to), and the dGPU 403 cannot be initialized.

On a condition that the flashing of the VBIOS instructions is stopped before completion, for example, due to power loss or a system crash (Yes decision), the dGPU 403 reads the copy of the portion of the VBIOS instructions (e.g., the bootloader portion of the VBIOS) from the system ROM 402 and writes the bootloader portion to the additional non-volatile memory (e.g., the dGPU ROM 404) at block 310 and then re-initializes the VBIOS and re-flashes the VBIOS instructions, at block 312, using the copy of the bootloader portion 405 of the VBIOS instructions written to the dGPU ROM 404.

Accordingly, because the copy of the bootloader portion 405 of the VBIOS instructions is written to the additional non-volatile memory, the SMUIO registers 414 become accessible, the dGPU ROM 404 can be read from and written to, and the dGPU 403 can be initialized.

The method 300 then reverts back to decision block 308 to determine whether or not the flashing (i.e., re-flashing) of the VBIOS instructions is stopped before completion. The copy of the bootloader portion of the VBIOS instructions is also maintained in the system ROM 402 until the flashing successfully completes. Accordingly, on a condition that the flashing of the VBIOS instructions is stopped again before completion, the bootloader portion of the VBIOS instructions can once again be used to re-initialize and re-flash the VBIOS instructions.

On a condition that the flashing of the VBIOS instructions is not stopped before completion, the existing version of the VBIOS in the dGPU ROM 403 is successfully replaced with the new version of the VBIOS and the method ends at block 314.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A computing device for use with graphics processing, the computing device comprising:
   non-volatile system memory; and
   a graphics processor, in communication with the non-volatile system memory and comprising additional non-volatile memory, the graphics processor configured to:
   prior to flashing video basic input/output system (VBIOS) instructions, write a copy of a portion of the VBIOS instructions from the additional non-volatile memory to the non-volatile system memory;
   flash the VBIOS instructions;
   on a condition that the flashing of the VBIOS instructions is stopped before completion, write the copy of the portion of the VBIOS instructions from the non-volatile system memory to the additional non-volatile memory; and
   re-flash the VBIOS instructions using the copy of the portion of the VBIOS instructions.

2. The computing device of claim 1, wherein the copy of a portion of the VBIOS instructions is configured to initialize the VBIOS for flashing.

3. The computing device of claim 1, wherein flashing the VBIOS instructions comprises updating the VBIOS instructions by replacing a version of the VBIOS instructions in the additional non-volatile memory with a different version of the VBIOS instructions.

4. The computing device of claim 1, wherein the condition that the flashing of the VBIOS instructions is stopped before completion is a loss of power to the computing device or a system crash.

5. The computing device of claim 1, wherein the graphics processor is a discrete graphics processing unit (dGPU).

6. The computing device of claim 5, further comprising a display device, wherein the dGPU is configured to generate graphics data for display on the display device.

7. The computing device of claim 1, wherein after an instruction is received to flash the VBIOS instructions, the graphics processor is configured to reserve a space in the non-volatile system memory for the VBIOS instructions and write the copy of the portion of the VBIOS instructions to the non-volatile system memory without any additional user input.

8. The computing device of claim 1, wherein the graphics processor comprises registers which are configured to store data for initializing the graphics processor, and the graphics processor is configured to re-flash the VBIOS instructions by accessing the registers.

9. A method of flashing video basic input/output system (VBIOS) instructions, the method comprising:
   prior to flashing the VBIOS instructions, writing a copy of a portion of the VBIOS instructions to non-volatile system memory of a computing device from additional non-volatile memory of a graphics processor;
   flashing the VBIOS instructions;
   on a condition that the flashing of the VBIOS instructions is stopped before completion, write the copy of the portion of the VBIOS instructions from the non-volatile system memory to the additional non-volatile memory; and
   re-flashing the VBIOS instructions using the copy of the portion of the VBIOS instructions.

10. The method of claim 9, wherein the copy of a portion of the VBIOS instructions is configured to initialize the VBIOS for flashing.

11. The method of claim 9, wherein flashing the VBIOS instructions comprises updating the VBIOS instructions by replacing a version of the VBIOS instructions in the additional non-volatile memory with a different version of the VBIOS instructions.

12. The method of claim 9, wherein the condition that the flashing of the VBIOS instructions is stopped before completion is a loss of power to the computing device or a system crash.

13. The method of claim 9, wherein the graphics processor is a discrete graphics processing unit (dGPU).

14. The method of claim 13, wherein the dGPU is configured to generate graphics data for display on a display device of the computing device.

15. The method of claim 9, wherein after an instruction is received to flash the VBIOS instructions, the graphics processor is configured to reserve a space in the non-volatile system memory for the VBIOS instructions and write the copy of the portion of the VBIOS instructions to the non-volatile system memory without any additional user input.

16. The method of claim 9, further comprising re-flashing the VBIOS instructions using the copy of the portion of the VBIOS instructions by accessing registers used to store data for initializing the graphics processor.

17. A non-transitory computer readable medium comprising instructions for causing a computer to execute a method of flashing VBIOS instructions comprising:
   prior to flashing the VBIOS instructions, writing a copy of a portion of the VBIOS instructions to non-volatile system memory of a computing device from additional non-volatile memory of a graphics processor;
   flashing the VBIOS instructions;
   on a condition that the flashing of the VBIOS instructions is terminated before completion, write the copy of the portion of the VBIOS instructions from the non-volatile system memory to the additional non-volatile memory; and
   re-flashing the VBIOS instructions using the copy of the portion of the VBIOS instructions.

18. The non-transitory computer readable medium of claim 17, wherein the copy of a portion of the VBIOS instructions is configured to initialize the VBIOS instructions for flashing.

19. The non-transitory computer readable medium of claim 18, wherein the condition that the flashing of the VBIOS instructions is stopped before completion is a loss of power to the computing device or a system crash.

20. The non-transitory computer readable medium of claim 18, wherein after an instruction is received to flash the VBIOS instructions, reserving a space is in the non-volatile system memory for the VBIOS instructions and writing the copy of the portion of the VBIOS instructions to the non-volatile system memory without any additional user input.

\* \* \* \* \*